United States Patent [19]
Chien

[11] Patent Number: 5,683,164
[45] Date of Patent: Nov. 4, 1997

[54] ILLUMINATED WHEEL

[76] Inventor: Tseng Lu Chien, No. 29, Alley 73, Lin-Shen Street, Shi-Chi Town, Taipei Hseng, Taiwan

[21] Appl. No.: 561,973

[22] Filed: Nov. 22, 1995

[51] Int. Cl.$^6$ ...................................... B60Q 1/26
[52] U.S. Cl. ................ 362/78; 362/276; 362/802; 361/772; 446/439; 446/485
[58] Field of Search ................ 362/35, 78, 103, 362/251, 276, 802; 301/5.3, 5.7, 108.3, 104.4, 37.36, 37.42; 361/772, 774, 760; 446/47, 242, 438, 439, 485

[56] References Cited

U.S. PATENT DOCUMENTS

| | | | |
|---|---|---|---|
| 1,456,258 | 5/1923 | Stoner | 362/78 |
| 3,789,208 | 1/1974 | Lewis | 362/103 |
| 4,135,324 | 1/1979 | Miller et al. | 46/74 |
| 4,176,390 | 11/1979 | Galbert | 362/72 |
| 4,231,079 | 10/1980 | Heminover | 362/106 |
| 4,363,502 | 12/1982 | Bakerman | 362/103 |
| 4,383,244 | 5/1983 | Knauff | 340/321 |
| 4,435,917 | 3/1984 | Lee | 46/228 |
| 4,991,066 | 2/1991 | McCowan | 362/61 |
| 5,016,144 | 5/1991 | DiMaggio | 362/35 |
| 5,145,444 | 9/1992 | Van Kuiken | 446/485 |
| 5,278,732 | 1/1994 | Frankum | 362/72 |
| 5,290,184 | 3/1994 | Balogh et al. | 446/47 |
| 5,294,188 | 3/1994 | Vancil, Jr. | 362/78 |
| 5,319,531 | 6/1994 | Kutnyak | 362/184 |
| 5,392,200 | 2/1995 | Milde | 362/78 |
| 5,406,724 | 4/1995 | Lin | 36/137 |
| 5,465,197 | 11/1995 | Chien | 362/203 |
| 5,475,572 | 12/1995 | Tseng | 362/78 |

*Primary Examiner*—Alan Cariaso
*Attorney, Agent, or Firm*—Bacon & Thomas

[57] ABSTRACT

An illuminated wheel includes a power source made up of series-connected pairs of parallel-connected button type batteries or parallel-connected pairs of series-connected batteries, a printed circuit board on which are mounted arc shaped common contacts for the circumferential outer electrodes of each pair of batteries and individual contacts having resilient arms for engaging the planar contacts of the batteries while accommodating battery thickness variations, an integrated circuit controller for controlling the duration and timing by which power is supplied to a plurality of lighting elements, and a motion sensitive switch made up of a pair of contacts extending from the circuit board and a conductive plate having two openings loosely fitted over the respective contacts of the contact pair. The circuit bard is positioned in a recess molded into the wheel, and the recess is closed by a transparent or partially transparent snap-on cover which exhibits optical effects such as diffraction or magnification of light from the lighting elements.

20 Claims, 7 Drawing Sheets

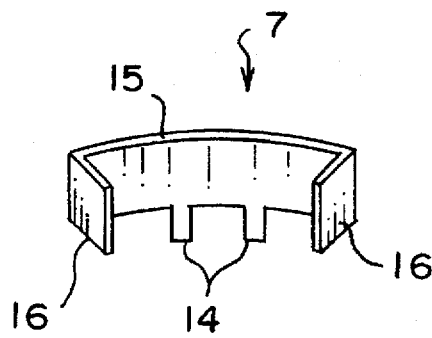
FIG. 2-B
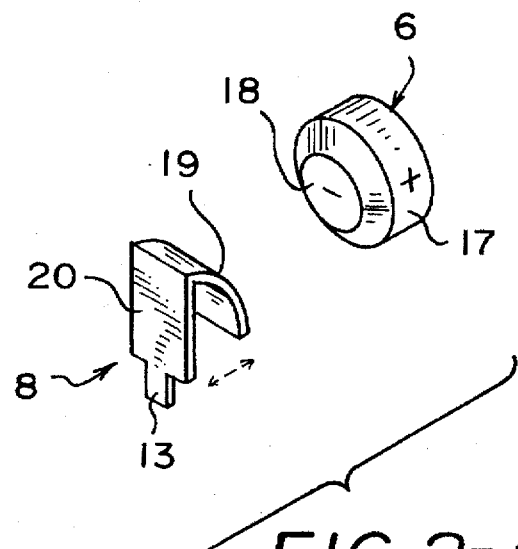
FIG. 2-A
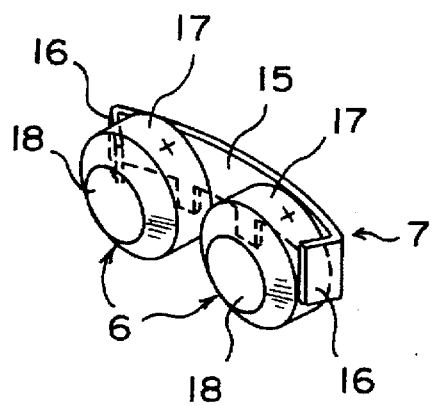
FIG. 2-C
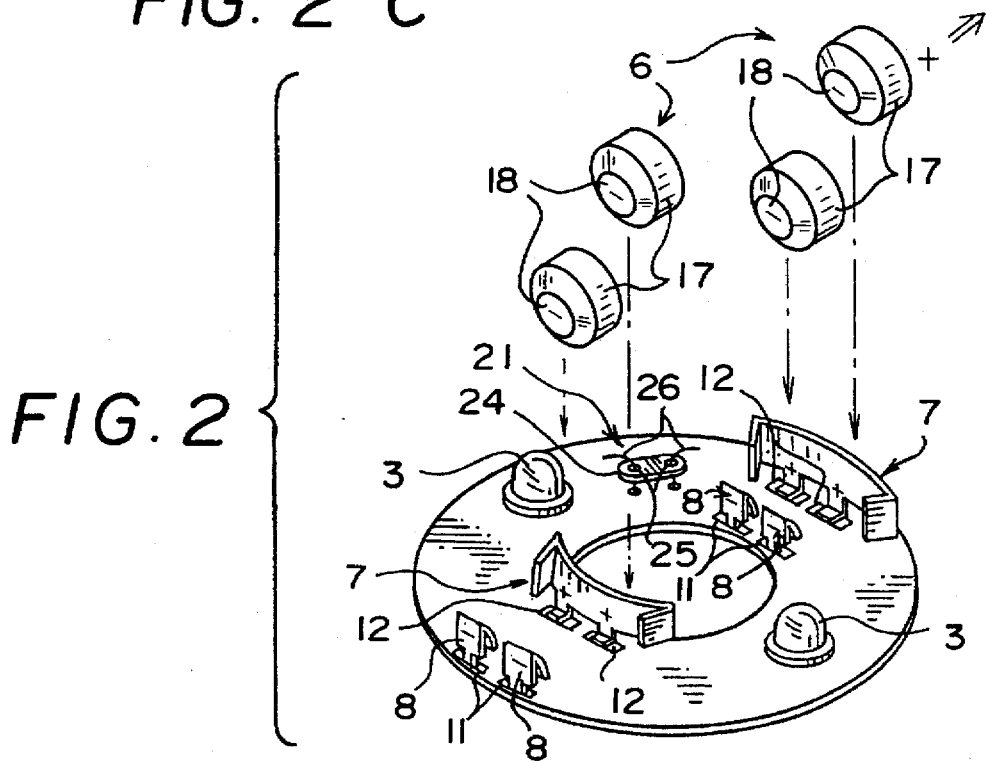
FIG. 2

FIG. 3
FIG. 3-A
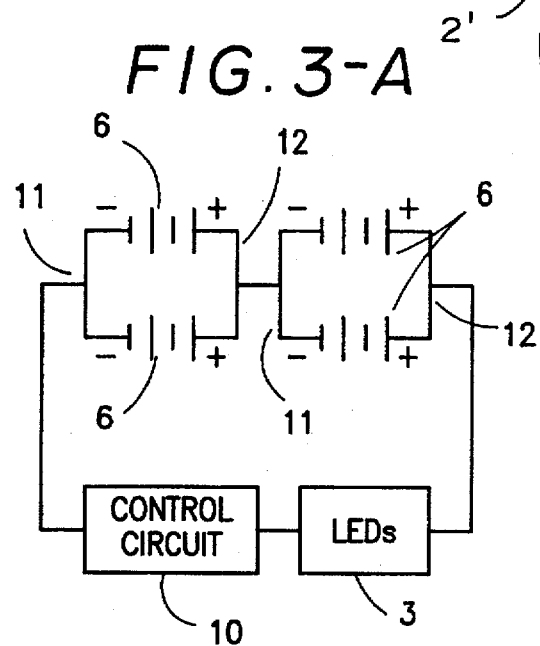
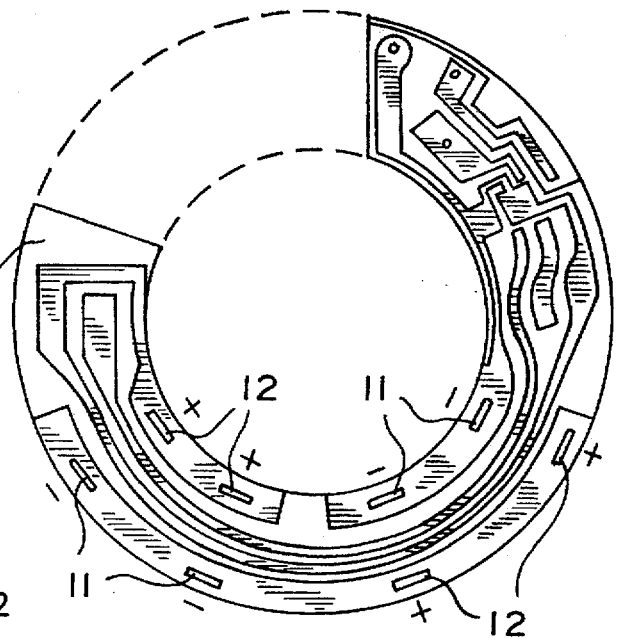
FIG. 4
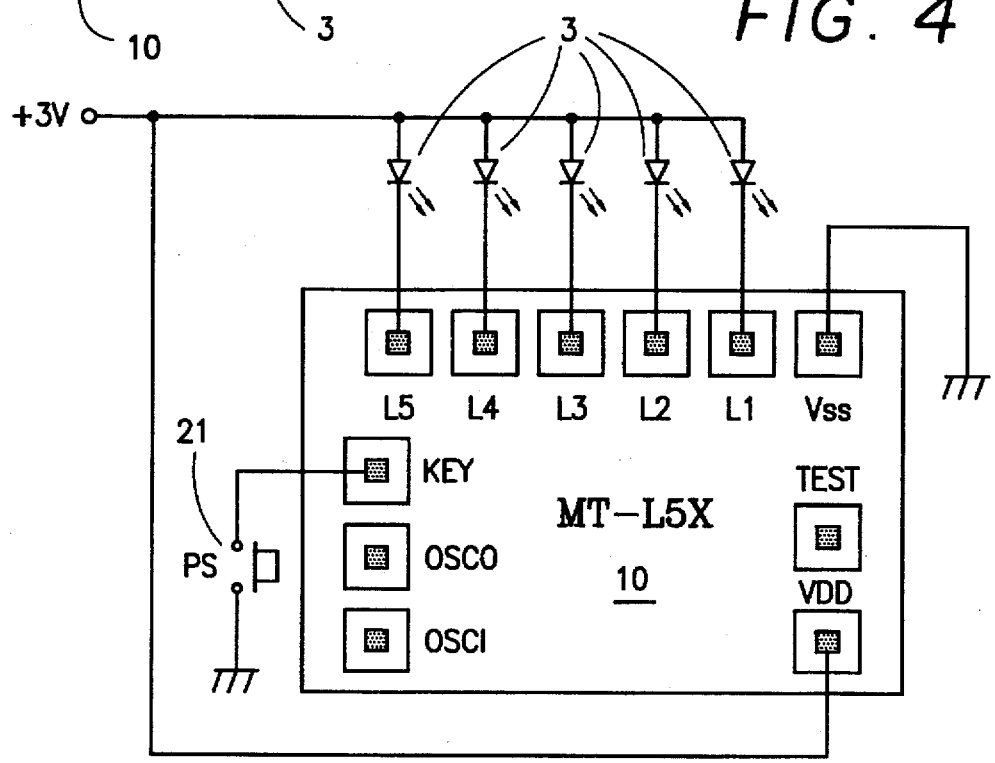

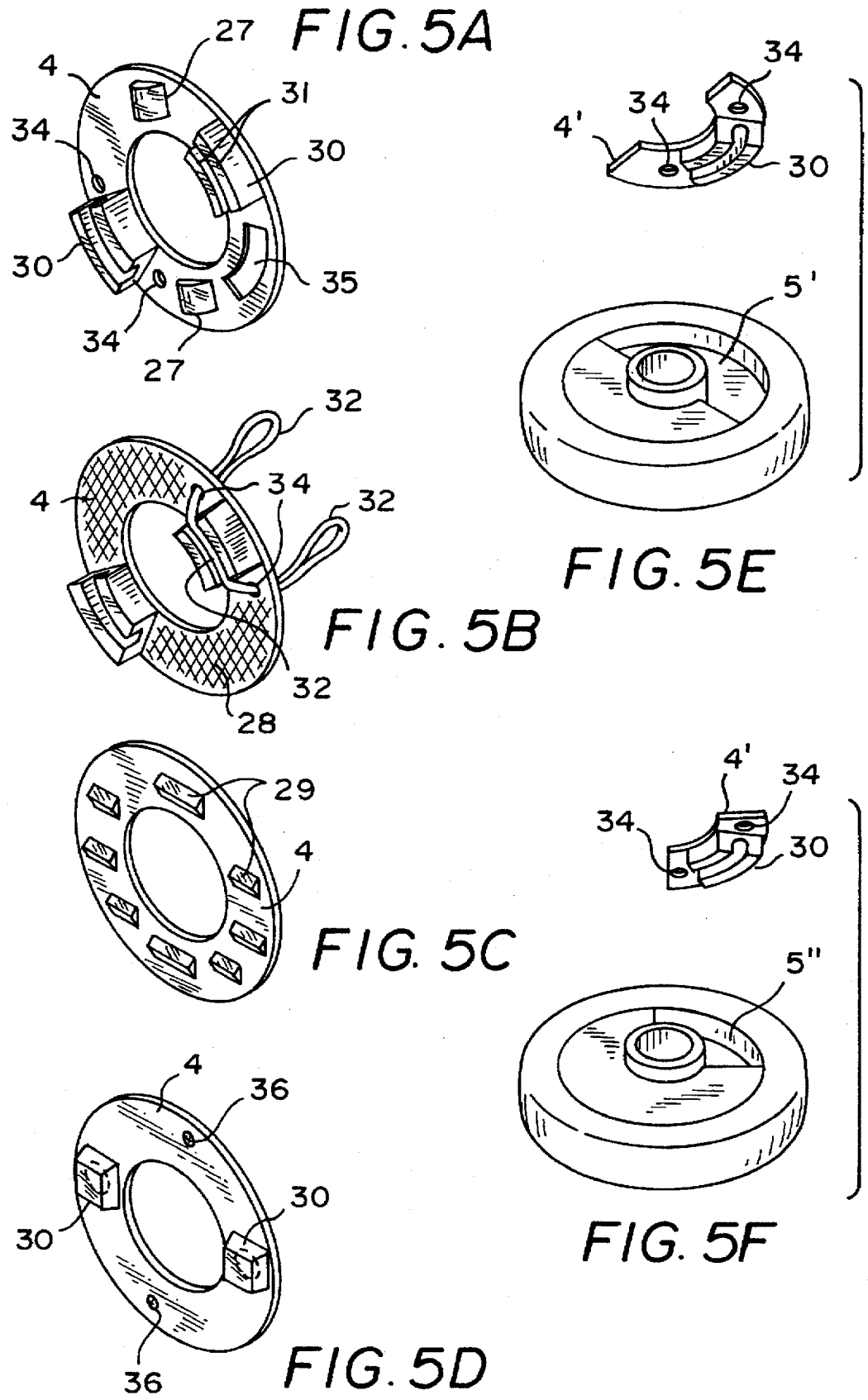

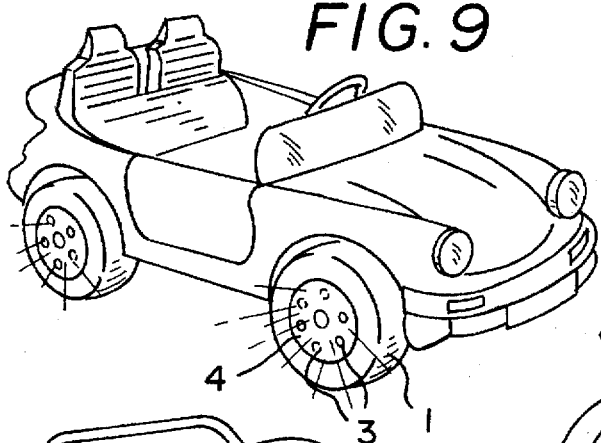
FIG. 9
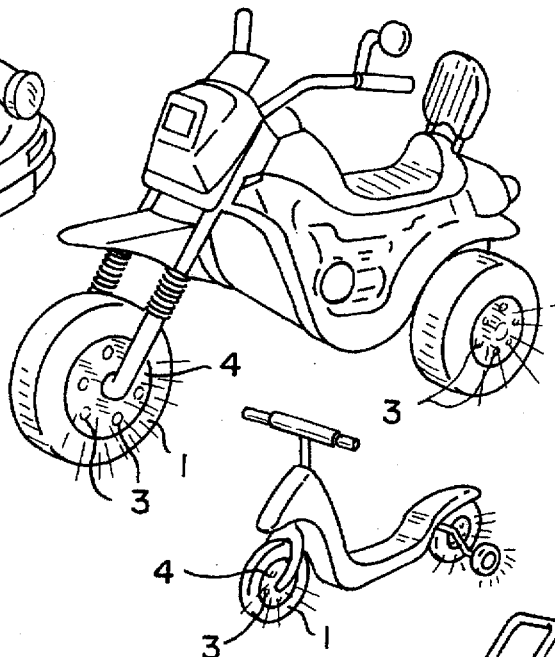
FIG. 12
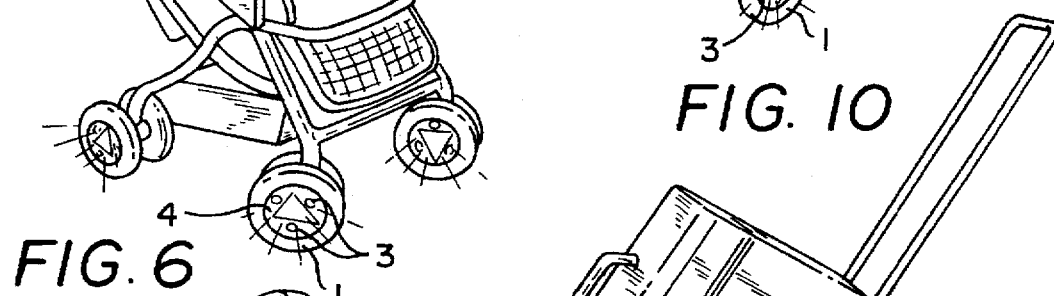
FIG. 10
FIG. 6
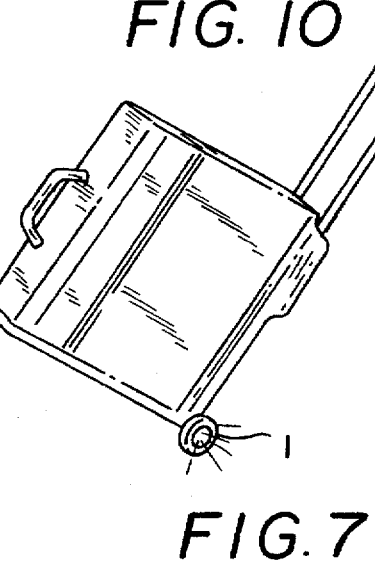
FIG. 7
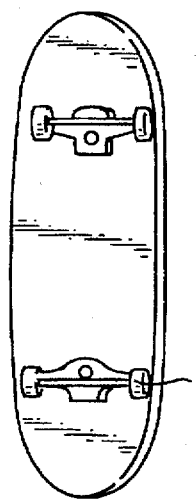
FIG. 8
FIG. 11

ILLUMINATED WHEEL

BACKGROUND OF THE INVENTION

1. Field of the Invention

This invention relates to an illuminated wheel. Applications for the illuminated wheel of the invention include infant "walkers," tricycles, miniature cars and toys, bicycles, baby strollers, scooters, in-line skates, skate boards, travel cases or luggage carriers, and other non-motorized movable objects. The illuminated wheel of the invention may also find application in motorized vehicles of various types.

2. Discussion of Related Art

The present invention seeks to provide a relatively low cost illuminated wheel capable of a variety of special effects. While the principles of the invention may find application in a variety of contexts, the invention is especially suited for objects having relatively small diameter molded plastic wheels. It involves improvements in the power source, including an improved power supply circuit, improved battery contacts, an improved motion sensitive or reactive switch, and in general a more compact and efficient layout for the illumination circuitry and lighting elements. Among the problems addressed by the invention are the problem of providing a sufficient power supply in a small space without increasing the cost, the problem of battery replaceability, and the problem of lighting element on/off control to achieve a desired effect.

For reasons of safety and durability, it has generally been preferred to utilize light emitting diodes (LEDs) in illumination arrangements of the type with which the present invention is concerned. However, while LEDs are eminently suitable for the applications mentioned above, the power supply problem has severely limited their use. Conventional dry cell batteries do not provide sufficient power or useable life, except in relatively bulky form, and therefore it is conventional to use relatively expensive lithium batteries to provide the necessary power. This greatly limits the commercial potential of illuminated wheels, since the cost of a lithium battery is approximately ten times that of a button cell battery, and the diameter of the lithium battery is three times (approximately 32 mm).

As an example of an application in which the 32 mm size limitation presents particular problems, the dimensions of a wheel for an in-line skate are conventionally 70 mm diameter×25mm width (or 60 mm×18 mm), which means that in order to make room for the lithium battery, portions of the wheel structure must be removed, significantly weakening the structure of the wheel and present a serious hazard, or the battery must be placed on a non-rotating portion of the skate, necessitating the use of a transformer arrangement, which further increases the cost of the illumination. Despite the obvious benefits of providing illuminated wheels, both to make the skate more visible to motorists and for esthetic reasons, illumination of skate wheels has to date been considered impractical. The same problems also apply to stroller, tricycles, and other applications mentioned above.

The problem of replaceability has also been a significant factor in limiting the use of illumination arrangements in this context. Generally, the battery is contained in a sealed unit or molded into the wheel material itself to make the lighting unit waterproof, but the resulting unit can last only as long as the battery, thus limiting the useable life of the object to be illuminated, adding to the effective cost of the object and to the problem of solid waste.

The problem of lighting element control has generally been solved by activating the lighting elements in response to a motion sensitive or reactive switch. Conventional motion sensitive switches use either a mercury contact or a spring contact. Mercury contacts are expensive and environmentally detrimental, while even spring contacts are relatively costly and do not provide a completely satisfactory flashing effect.

SUMMARY OF THE INVENTION

It is accordingly an objective the invention to provide an illumination arrangement for a movable object such as a wheel, which is relatively low in cost and provides greater versatility than prior arrangements.

It is a further objective of the invention to provide an illuminated wheel in which the conventional lithium battery is replaced by less expensive and smaller diameter button cell batteries, without sacrificing power or useful life.

It is a further objective of the invention to provide an illuminated wheel which provides convenient access to the battery in order to facilitate replacement and extend the useful life of the lighting arrangement.

It is a still further objective of the invention to provide a lighting arrangement having an improved control arrangement capable of providing motion sensitive or reactive flashing effects, as well as a variety of other special effects, such as chasing, random flashing, steady state illumination, sequential activation, and fade-in/fade out effects.

The problem of power supply is solved, in a preferred embodiment of the invention, by replacing the conventional lithium battery by at least two parallel connected pairs of series connected button cell batteries, or by two series connected pairs of parallel connected button cell batteries, the series/parallel combinations of batteries having an effective power and life which matches that of a lithium battery, and by providing an improved contact arrangement which takes advantage of the smaller diameter of the button cell batteries to and optimizes their spatial arrangement to fit within wheels too small to accommodate a lithium battery.

The problem of battery replacement is solved, according to the preferred embodiment of the invention, by providing the wheel with a removable cover through which the batteries can easily be accessed for replacement, and by the improved battery contact structure. The removable cover of this embodiment has the additional advantages of serving to protect the electrical components within the wheel, and of providing optical effects to enhance the visibility of the lighting elements contained therein. By providing an optical wheel cover, the visibility of the lighting elements can be increased at low cost and power consumption without increasing the number of lighting elements, while still permitting easy access to the battery for replacement.

The problem of control is addressed by adding an integrated circuit controller to control the duration of a activation of the lighting elements in response to activation by the switch, allowing the use of a simpler, less expensive motion sensor, in which even the use of a resilient member can be eliminated, and at the same time making possible the addition of effects such as sequential or random activation.

Combining the above solutions to the various problems which have prevented commercial exploitation of illuminated wheels of the type with which the present invention is concerned, the illuminated wheel of the preferred embodiment of the invention thus includes a power source made up of series-connected pairs of parallel-connected button type batteries or parallel-connected pairs of series-connected batteries, a printed circuit board on which are mounted arc shaped common contacts for the circumferential outer electrodes of each pair of batteries and individual contacts having resilient arms for engaging the planar contacts of the batteries while accommodating battery thickness variations, an integrated circuit controller for controlling the duration and timing by which power is supplied to a plurality of lighting elements, and a motion sensitive switch made up of a pair of contacts extending from the circuit board and a conductive plate having two openings loosely fitted over the respective contacts of the contact pair. The circuit board is positioned in a recess molded into the wheel, and the recess is closed by a transparent or partially transparent snap-on cover which exhibits optical effects such as diffraction or magnification of light from the lighting elements.

While the combination of an improved power supply, battery contacts, housing/battery access, and motion sensitive or reactive switch/controller described below in connected with the preferred embodiment of the invention provides the widest range of benefits, however, it is intended that at least some of the improvements provided by the invention could also be used separately, and that the invention should not be limited to the combination of elements disclosed, but rather should be as broadly interpreted as permitted by the prior art.

BRIEF DESCRIPTION OF THE DRAWINGS

FIG. 2 is a perspective view of a printed circuit board for use with the embodiment illustrated in FIG. 1.

FIG. 2-A is a perspective view of a negative battery terminal for use with the embodiment illustrated in FIGS. 1 and 2.

FIG. 2-B is a perspective view of a positive battery terminal for use with the embodiment illustrated in FIGS. 1 and 2.

FIG. 2-C is a perspective view of the positive battery terminal illustrated in FIG. 2-B.

FIG. 3 is a plan view of a printed circuit board for use with the embodiment of FIGS. 1 and 2.

FIG. 3-A is a schematic circuit diagram of the layout illustrated in FIG. 3.

FIG. 4 is a schematic diagram of an integrated circuit suitable for use as a controller for the illuminated wheel of the preferred embodiment of the invention.

FIG. 5A is a perspective view of an alternative version of a cover for the embodiment shown in FIG. 1.

FIGS. 5B–5F show different optical designs for the cover of FIG. 5A.

FIGS. 6–12 illustrate various alternative applications of the wheel arrangement of the preferred embodiment illustrated in FIG. 1.

DETAILED DESCRIPTION OF THE PREFERRED EMBODIMENTS

Figure 1:
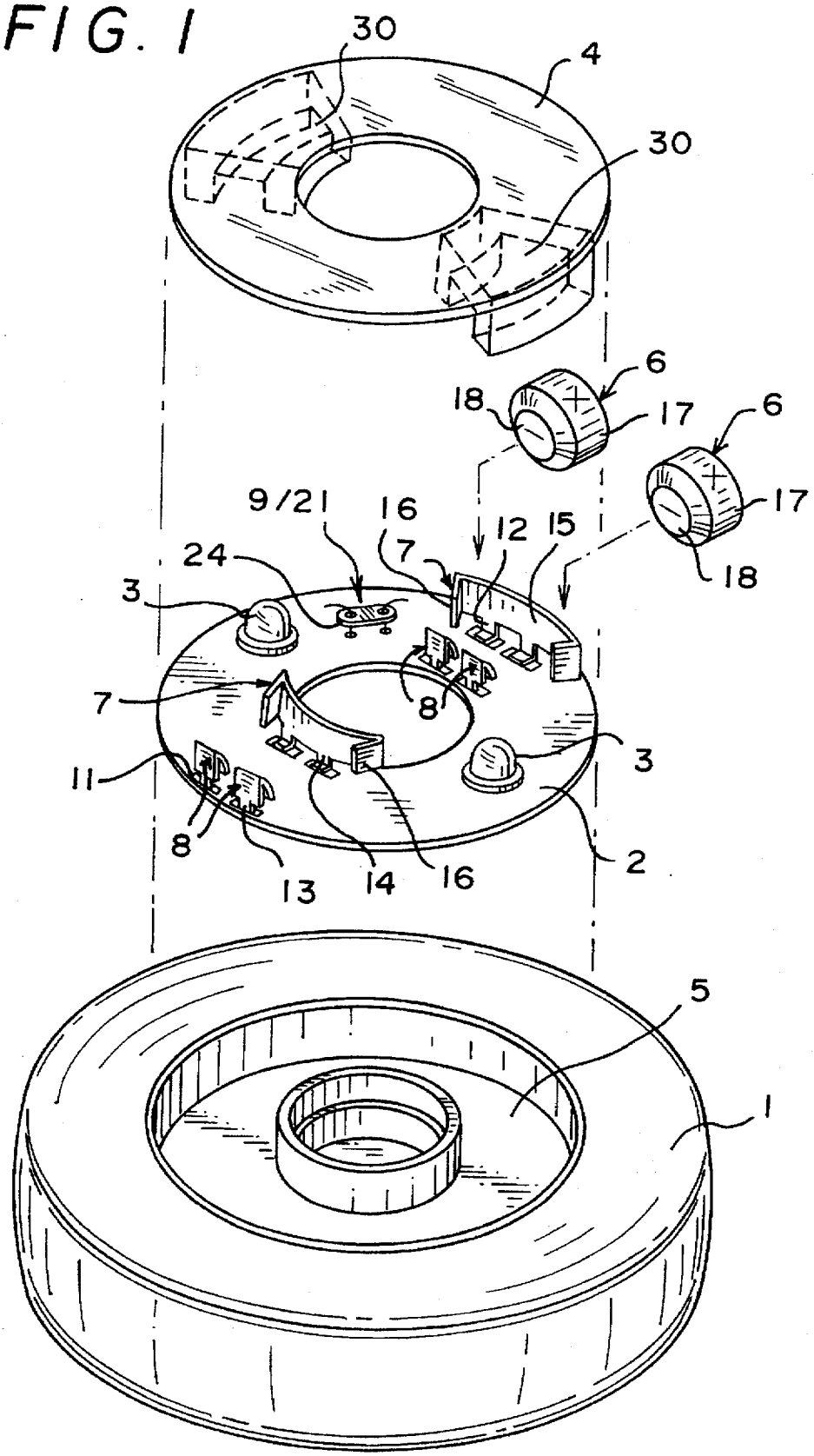
FIG. 1 is an exploded perspective view of an illuminated wheel constructed according to a preferred embodiment of the invention.

As illustrated in FIG. 1, the invention provides an illuminated wheel construction generally made up of a wheel body 1, a printed circuit board 2, lighting elements 3, and a cover 4.

The wheel may be in the form of a polyurethane disc into which is molded a recess 5, although those skilled in the art will appreciate that the exact form, size, and material of the wheel will depend on its application. For example, the wheel may of the type which includes a bearing structure, as is the case for in-line skates, or the wheel may be affixed directly to an axle.

Recess 5 is illustrated in FIG. 1 as being in the form of an annular groove, so as to accommodate annular circuit board 2 and annular cover 4, but those skilled in the art will appreciate that neither the groove, the circuit board, nor the cover need be annular in shape, and that for wheels which bear a significant load, the portion of the wheel into which the recess extends should be minimized to the extent possible so as to preserve the structural integrity of the wheel. Due to the persistence of vision effect of a rotating lighting element, the lighting elements do not need to be located completely around the circumference of the wheel, so that the recess need only be large enough to contain the desired lighting elements 3, batteries 6, battery contacts or terminals 7 and 8, and electrical components including a switch 9 (preferably in the form of a motion sensitive or reactive switch 21, described below) and integrated circuit 10.

A suitable circuit board layout is shown for example in FIG. 3. This circuit board 2' may either be annular in shape, as indicated by the dashed lines, or may extend over a angle of less than 360°. The traces on the illustrated circuit board include sets of negative and positive openings 11 and 12 arranged to receive respective PCB tails 13 and 14 of the negative and positive battery contacts 7 and 8 to form two pairs of parallel connected batteries, which in turn are series connected to the lighting elements 3 and circuit elements 9 and 10, and illustrated in FIG. 3-A. Alternatively, as those skilled in the art will immediately recognize, the traces on the circuit board could be arranged to form two series connected pairs of batteries, the series connected pairs in turn being parallel connected to each other, or the number of batteries could be varied.

The illustrated button cell batteries are inexpensive cylindrical batteries of the type widely used in the digital watch and toy business, as opposed to the expensive lithium power supplies required in the prior designs. While, as mentioned above, a lithium battery has the advantage of high power (the battery sold by Maxwell Co. of Japan, Model #2032, for example, outputs 200 ma at 3V), two conventional button cell batteries connected in series at 120 ma and 1.5V will just as effective at one-eighth the cost (a suitable battery is sold as Model LR 1154 by Golden Power Co. of Hong Kong). In fact, by connecting two parallel connected battery sets in series, a cost savings of 75% can still be achieved while greatly increasing the useful life of the device. For example, using the preferred module, a 3.0V, 120 ma output can be obtained using two inexpensive 1.5V, 120 ma batteries, and the current can be increased to 240 ma by using a parallel combination of the batteries.

The button cell batteries of the preferred embodiment of the invention have, as is conventional, a positive electrode 17 extending around the periphery of the battery and a flat negative electrode 18 on one side of the battery. The unique contact structure of the invention makes use of this geometry to optimize the space requirements for the batteries, as is best illustrated in FIGS. 2 to 2-C.

As illustrated, the positive battery contacts 7 each include an arc-shaped portion 15 from which extends the PCB tails 14 and, at ends of the arc, arms 16. The arc shape permits the positive contacts to conform to the shape of the circuit board, with the positive contact located on the outside perimeter of the circuit board having a outward curvature, and the positive contact located on the inside perimeter of the circuit board having an inward curvature. Arms 16 extend substantially transversely to the arc shaped portion of both the inner and outer positive contacts, but the angle between the arc shaped portion and the arms is more acute for the inner positive contact so that the distal ends of the arms of both the inner and outer positive contacts are biased to positively engage the positive circumferential terminals of a pair of conventional button cell batteries.

In contrast, while pairs of the negative contacts only a single negative terminal is provided for each negative battery electrode, and each of the separate negative contacts has the approximate shape of the Greek letter "eta" ($\eta$), with a free leg 19 extending from fixed leg 20 of the contacts to form a spring bias in a direction transverse to the bias provided by the arms of the positive contacts so as establish a secure electrical connection with button cell batteries having different thicknesses. As a result, the positive terminal can thus serve as a common terminal for the series parallel combination, while the negative terminal shape permits batteries of different sizes to be used, and the contact structure in general optimizes the spatial requirements of the battery arrangement.

In order to provide a greater variety of special effects and enable a more stable response to motion, it is preferred that the control circuit include an integrated circuit controller. Examples of a suitable integrated circuit controller include Maintech Semiconductor Inc.'s model No. MT-L5x/MT-L61/MT-L62 series circuits, each of which is capable of flashing the LEDs at 0.1 second intervals, which is sufficient to provide a persistence of vision effect and give the illusion of continuous illumination while reducing power consumption.

Figure 4A:
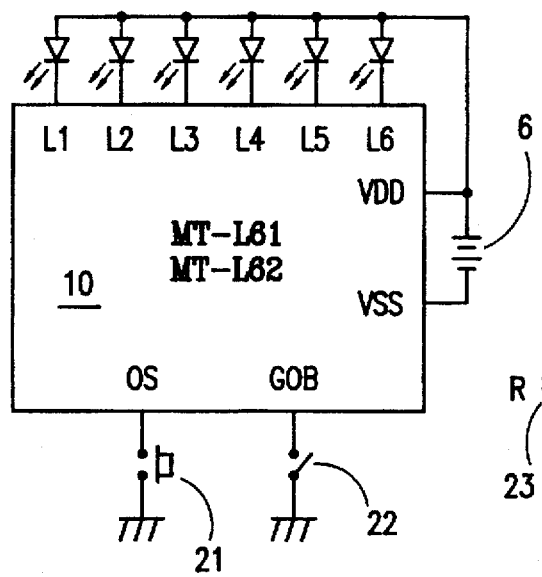
FIGS. 4A–4H show various connections for an alternative controller arrangement for the illuminated wheel of the preferred embodiment of the invention.
Figure 4B:
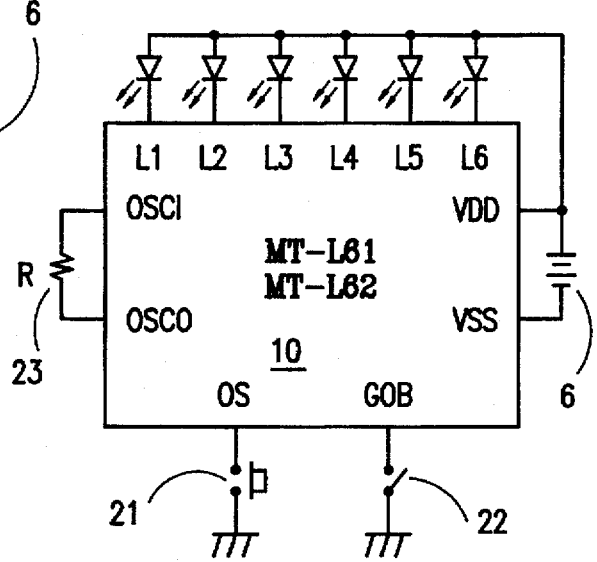
Figure 4C:
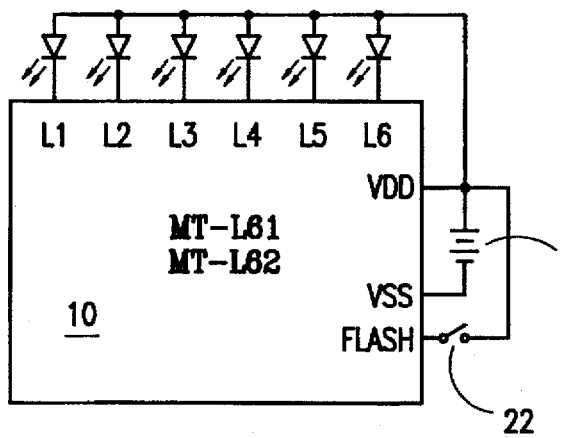
Figure 4D:
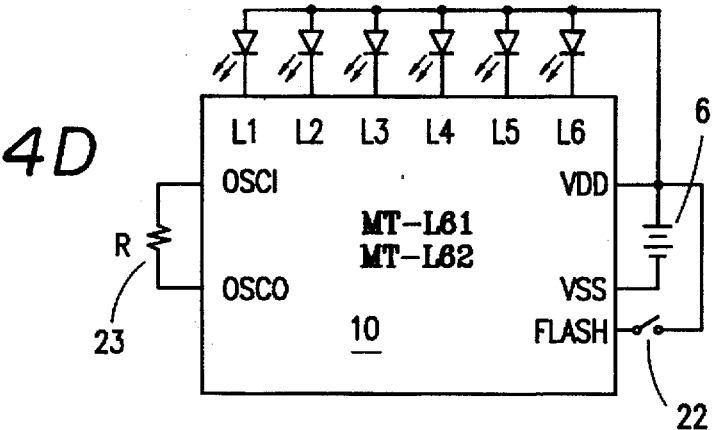
Figure 4E:
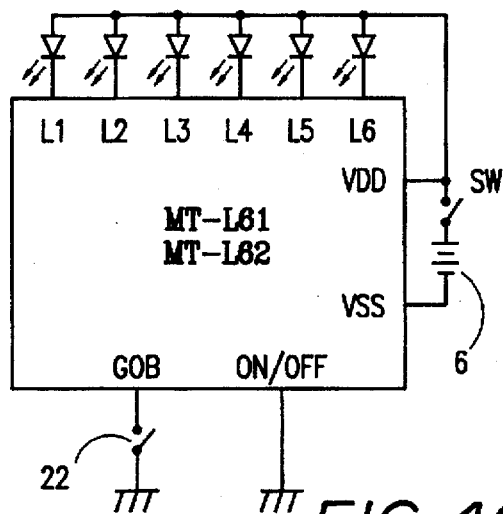
Figure 4F:
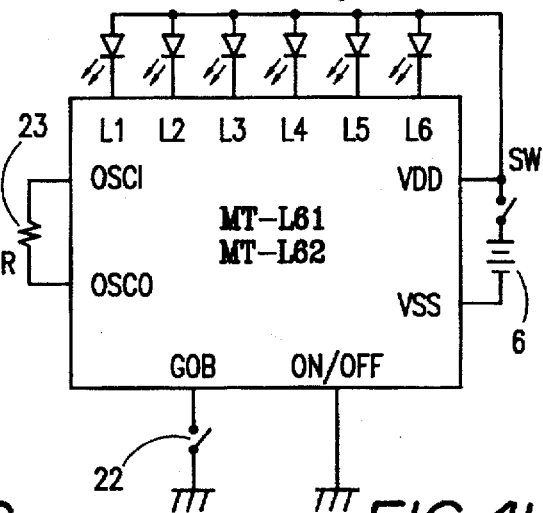
Figure 4G:
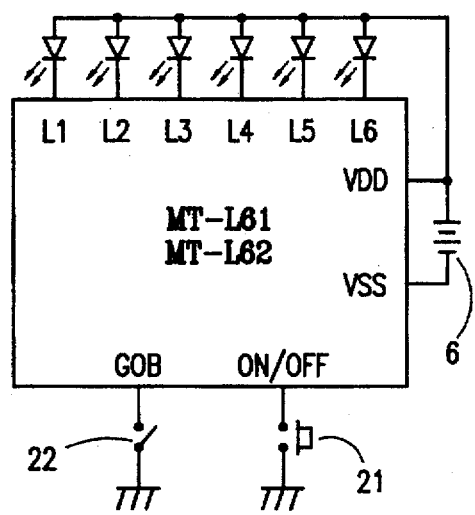
Figure 4H:
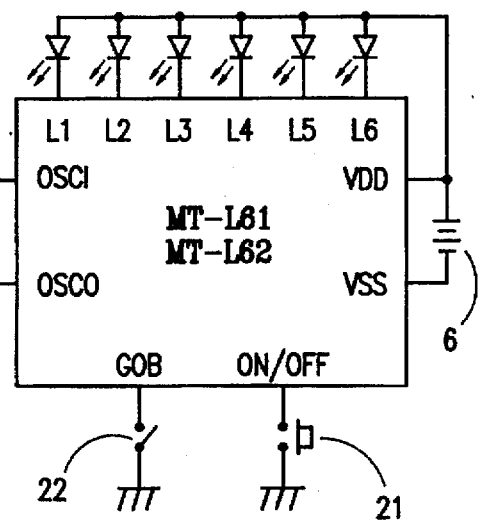
Figure 4I:
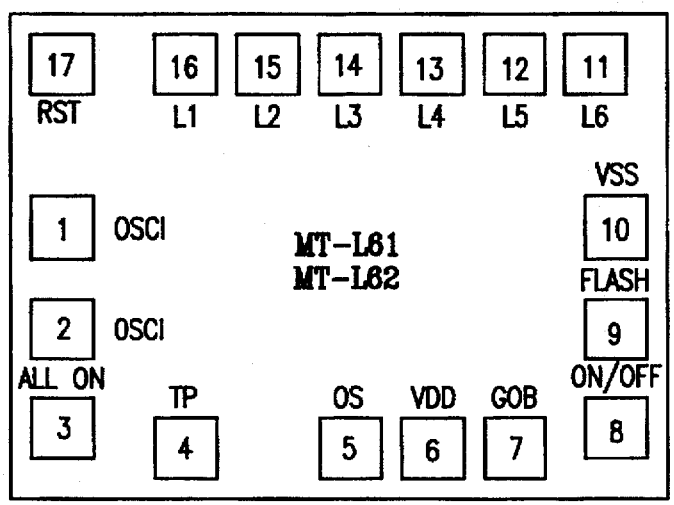
FIG. 4I illustrates an alternative integrated circuit for use with the lighting arrangement of the preferred embodiment of the invention.

The terminal or pin layout of the Maintech MT-L5x series controller is illustrated in FIG. 4, while various arrangements of the Maintech MT-L61/62 series integrated circuits are illustrated in FIGS. 4A–4H, and the pin or terminal layout of the L61/62 series controllers are illustrated in FIG. 4I. The MT-L5X series controller uses CMOS technology to provide on/off control of five LEDs, with a working voltage of 2.0–5.0VDC and a static power drain of 5µA, all functions being controlled by a 4-way function switch which provides flashing and steady state activation at a rate determined by the voltage at the terminals of an on-board oscillator. The L61/62 series integrated circuits are similar, but provide control for six LEDs, with various triggering options as shown in FIGS. 4A–4H depending on placement of the motion sensor switch 21 and/or a manual on/off switch 22, the flash rate being determined by the presence or absence of a resistor 23 in the oscillator circuit.

As illustrated in FIG. 4I, the size of this integrated circuit is 1660 µm by 1600 µm, with the integrated circuit of FIG. 4 being significantly smaller. In either case, the chip size is well-within the available footprint for applications of the type noted above. The terminal assignments illustrated in FIG. 4I (and FIG. 4) are as follows: OSCI is an oscillator input terminal, OSC0 is an oscillator output terminal; ALLON produces a steady state output for all LEDs; TP is an internal test pin; OS serves as a trigger for LED control pin 16, VDD is the positive voltage input; GOB initiates a chasing or scanning effect; ON/OFF can be used to flash LEDs on command or in response to external events; FLASH causes all of the LEDs to flash; VSS is the negative voltage input; L1–L6 are LED control pins, and RST carries out a variety of different functions depending on the initially selected function.

Those skilled in the art will of course appreciate that while an especially preferred controller circuit has been described in detail, other dedicated or programmable LED controllers may be substituted for the illustrated controller integrated circuits, and that the above description is not intended to be limiting.

Because of the enhanced controllability achieved through use of the motion sensitive switch 21 as a trigger rather than as a control for determining the duration of activation, the choice of motion sensitive switch devices is significantly broadened. While virtually any known motion sensor can be used, however, the preferred sensor switch 21 has the unique feature that one of the contacts of the sensor is a conductive plate 24 having two openings 25, the diameter and spacing of which controls the sensitivity of the switch, and the other contacts are in the form of members 26 extending through the openings. The use of a stamped and formed plate 24 provides the least expensive contact possible, and since the switch is used as a trigger, the plate can simply be allowed to slide around on the circuit board, so long as the plate 24 is not allowed to slide off the contact members 26, which can easily be accomplished simply by bending over the ends of the two contact members 26 to loosely retain plate 24 in place.

The use of a plate having two openings fitted over two stationary contact members to move relative thereto without falling off replaces the spring or vibrator of the conventional motion sensitive switch, which has a cost of around US $0.10 per sensor, mainly due to the cost of the spring or vibrator, and the difficulty in properly positioning the moving element relative to the stationary contact or contacts and affixing the element in place. No such difficulties exist for the present invention. By utilizing a plate with two holes fitted over two stationary contacts, the cost of the sensor can be reduced by as much as 90%.

Furthermore, since virtually all of the control functions can be contained within the integrated circuit, which can be potted in order to waterproof the circuit, the use of the integrated circuit eliminates the need to provide expensive waterproofing arrangements or to permanently seal the circuitry within the wheel, thus making it much easier to provide for access to the batteries, and leaving greater flexibility in cover design.

For example, as shown in FIGS. 1 and 5A–5F, the cover can be annular (FIGS. 1 and 5A–5D) or arc shaped (FIGS. 5E and 5F). Also, the cover can be a disc whose only optical property is transparency, as shown in FIG. 1, or the cover can include a variety of optical elements, including convex lenses 27, as shown in FIG. 5A, diffraction patterns 28, prism like projections 29 as shown in FIG. 5C, hollow projections for permitting the LEDs to extend thereinto, as shown in FIG. 5D, or any other desired shape utilizing either refractive or diffractive effects. Additional optical effects could also be achieved by making the cover only partially transparent or translucent, or by making the cover of different colors, and by including printing or designs on the cover.

Finally, in the illustrated embodiments of the invention, the annular cover 4 (or arc-shaped covers 4' and 4") are each equipped with an arc-shaped latching member for securing or fastening the cover to the wheel. The cover may also be provided with a means for facilitating removal of the cover from the wheel.

As illustrated in FIGS. 5A, 5B, 5E, and 5F, for example, the cover utilizes a snap-in latch arrangement 30 consisting of two arms 31 arranged to engage appropriately shaped sides of recess 5 and thereby removably secure the cover to the wheel. In the embodiments shown in FIGS. 5A, 5B, 5E, and 5F, removal of the cover is facilitated by the provision of a cord 32 threaded through openings 34 in the cover and through a central channel of the latch, and/or a coin slot 35. It will be appreciated by those skilled in the art, however, that while the illustrated latch is especially simple, the latch could take a variety of different forms, including a slidable or pivotal latch, or the cover could be removably fastened to the wheel by means such as screws 36 illustrated in FIG. 5D.

As indicated above, the illuminated wheel of the present invention can be used in a variety of applications. Non-limiting examples of these applications are illustrated in FIG. 6 (baby stroller), FIG. 7 (luggage), FIG. 8 (in-line skate), FIG. 9 (child's racing car), FIG. 10 (scooter), FIG. 11 (skate board), and FIG. 12 (tricycle). It is believed that for the technical reasons described above, including cost and battery replaceability, illumination of the wheels has not even been attempted, at least in a mass-marketed product. Nevertheless, the advantages of wheel illumination from the standpoints of product attractiveness and safety are clear, and thus the benefits of the simple and inexpensive illumination arrangement provided by the invention should be significant.

Having thus described various preferred embodiments of the invention, those skilled in the art will appreciate that variations and modifications of the preferred embodiment may be made without departing from the scope of the invention. It is accordingly intended that the invention not be limited by the above description or accompanying drawings, but that it be defined solely in accordance with the appended claims.

I claim:

1. An illuminated wheel, comprising:

a wheel-shaped main body having a recess;

a cover for the recess made of a material having optical properties for transmitting light from a lighting element situated in the recess;

means for removably fastening the cover to the wheel-shaped main body;

means including a set of battery terminals for mutually parallel-connecting a pair of button cell batteries or for mutually series-connecting the pair of button cell batteries, and for further series connecting the pair of parallel-connected button cell batteries or parallel-connecting the pair of series-connected button cell batteries to provide a power source for the lighting element; and means for connecting the battery terminals to the lighting element, wherein the lighting element connecting means includes a motion reactive device for triggering an integrated circuit to turn on the lighting element for a predetermined period of time and then to turn off the lighting element.

2. A wheel as claimed in claim 1, wherein the cover is transparent.

3. A wheel as claimed in claim 1, wherein the recess extends 360° around the wheel, and said cover has an annular shape.

4. A wheel as claimed in claim 1, wherein the motion reactive device alternates between an on and an off state to trigger the integrated circuit.

5. A wheel as claimed in claim 1, wherein the reactive device includes a resilient member.

6. A wheel as claimed in claim 1, wherein the reactive device includes two stationary contacts and a conductive plate having two openings through which the respective contacts extend, the plate being movable relative to the contacts such that said contact intermittently engage edges of said two openings to establish an intermittent electrical connection between said two contacts in response to motion of said wheel-shaped body.

7. A wheel as claimed in claim 1, arranged as a baby stroller's wheel.

8. A wheel as claimed in claim 1, arranged as a wheel of an in-line skate.

9. A wheel as claimed in claim 1, arranged as a wheel of a toy.

10. A wheel as claimed in claim 1, arranged as a wheel of a child's racing car.

11. A wheel as claimed in claim 1, arranged as a wheel of a travelling case.

12. A wheel as claimed in claim 1, wherein the fastening means comprises two flexible latches arranged to snap into the recess.

13. A wheel as claimed in claim 1, wherein the fastening means is a screw.

14. A wheel as claimed in claim 1, wherein the lighting element is an LED and the cover has a convex shape to thereby magnify an image of the LED within the cover.

15. A wheel as claimed in claim 1, wherein the fastening means comprises an arc shaped member extending from said cover for insertion into said recess.

16. A wheel as claimed in claim 15, wherein the arc shaped member has a central channel for enabling the arc shaped member to flex as the arc shaped member is inserted into the recess.

17. A wheel as claimed in claim 16, wherein the central channel includes a cord which exits the cover through two holes to facilitate removal of the cover from the recess.

18. A wheel as claimed in claim 1, wherein a positive battery terminal of said set of battery terminals has an arc shaped portion with two arms extending from ends of the arc shaped portion, the two arms engaging respective circumferential electrodes of a pair of batteries.

19. A wheel as claimed in claim 1, wherein negative battery terminals of said set of battery terminals are arranged to contact planar electrodes of the button cell batteries, have an "η" shape, and are flexible to accommodate a variety of battery sizes.

20. An illuminated wheel, comprising:

a power source made up of series-connected pairs of parallel-connected button type batteries or parallel-connected pairs of series-connected batteries, said button type batteries having circumferential outer electrodes and planar electrodes;

a printed circuit board on which are mounted are shaped common contacts for the circumferential outer electrodes of each pair of batteries and individual contacts having resilient arms for engaging the planar electrodes of the batteries while accommodating battery thickness variations;

an integrated circuit controller for controlling a duration and timing by which power is supplied to a plurality of lighting elements; and a motion sensitive switch made up of a pair of contacts extending from the circuit board and a conductive plate having two openings loosely fitted over the respective contacts of the contact pair, wherein the circuit board is positioned in a recess molded into the wheel, and the recess is closed by a transparent or partially transparent snap-on cover which exhibits optical effects such as diffraction or magnification of light from the lighting elements.

\* \* \* \* \*